Patented Sept. 10, 1935

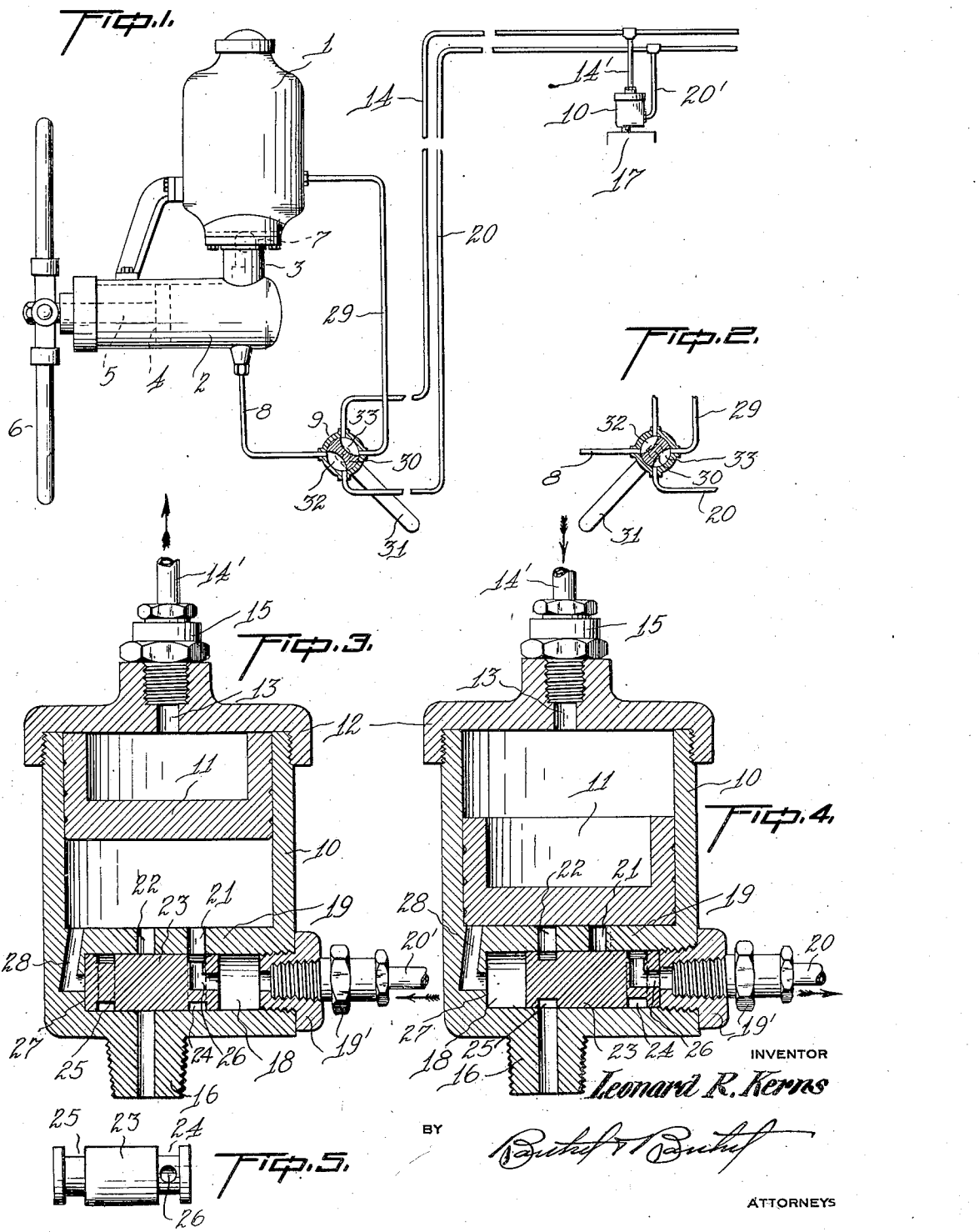

2,014,180

UNITED STATES PATENT OFFICE 2,014,180

LUBRICATING DEVICE

Leonard R. Kerns, Chicago, Ill., assignor, by mesne assignments, to The Farval Corporation, Cleveland, Ohio, a corporation of Ohio Application February 23, 1929, Serial No. 341,960

12 Claims. (Cl. 184—7)

The present invention pertains to a novel lubricating device designed for use in centralized lubricating systems, wherein a plurality of points may be lubricated in a single operation, as shown in my copending application Serial No. 341,957 of even filing date.

The invention is directed more particularly to the means for charging lubricant under pressure into the line leading to the various points to be lubricated.

This device includes a lubricant reservoir communicating with a grease gun in which the pressure is developed. By means of a unique pump and valve system, the pressure developed in the grease gun is first utilized to fill the pump and then to exert pressure within the pump whereby the charge of lubricant therein is delivered to the line. The pump further contains a valve controlling the flow of the lubricant to control the delivery and the discharge of lubricant with respect to the pump, and this valve is controlled by the direction of the pressure therein.

The invention is fully disclosed by way of example in the following description and in the accompanying drawing, in which—

Figure 1 is an elevation of the apparatus showing the control valve in section;

F'g. 2 is a cross section of the valve in a different position;

Fig. 3 is a section of the pump in loading position;

Fig. 4 is a similar section of the pump in discharged position; and

Fig. 5 is an elevation of the valve member.

Reference to these views will now be made by use of like characters which are employed to designate corresponding parts throughout.

In Figure 1 the apparatus is illustrated as including a reservoir I for containing a quantity of lubricant and communicating with the cylinder 2 of a grease gun through a neck 3. A piston 4 is slidably mounted in the grease gun and is operated by a threaded piston rod 5 and an exterior handle 6. Between the cylinder 2 and the reservoir I is a check valve device 7 which opens by gravity to permit the chamber of the gun to fill and closes by the pressure developed in the cylinder 2 when the piston 4 is moved inwardly.

During such operation of the grease gun, the lubricant thus trapped in the chamber is delivered to a pipe 8 communicating with a valve casing 9 in a manner which will presently be described in full.

The system also includes a pump comprising a body 10 having a piston 11 slidably mounted therein. The upper end of the body is closed by a cap 12 in which is formed a pressure opening 13, so called because it admits and relieves the pressure controlling the operation of the piston 11. A line 14 extends from the valve casing 9 and is branched at 14' and connected to the passage 13 by means of a fitting 15. The lower end of the body 10 is formed as a screwthreaded nipple 16 inserted in the bearing or other member 17 to be lubricated. It will be understood that a pump of this character is applied to each bearing in the system, and all such pumps have their respective pressure openings connected by branches to the line 14.

Above the nipple 16 the body 10 is formed with a valve chamber 18 separated from the piston chamber by a wall or partition 19. One end of the valve chamber is joined by fittings 19' and a branch 20' to another line 20 entering the valve casing 9 as clearly shown in Figures 1 and 2. The line 20 is common to the several pump units comprised in the system and is connected to them by branches similar to the branch 20'.

The partition 19 has a loading opening 21 establishing communication from the branch 20' through the chamber 18 to the piston chamber. There is also a discharge opening 22 in the partition 19 establishing communication between the piston chamber and the valve chamber and thence to the nipple 16. The valve chamber 18 contains a sliding valve 23 adapted in one position to close the port 22 and open the port 21 and in another position to open the port 22 and close the port 21 as illustrated in Figures 3 and 4 respectively.

The valve 23 is preferably a cylindrical member having grooves 24 and 25 at its ends, these grooves being spaced farther apart than the ports 21 and 22, so that only one groove at a time may register with the ports. The forward end of the valve 23, i. e., the end which takes the pressure of the branch 20', is formed with an angular duct 26 communicating with the groove 24. The parts are so dimensioned that when the rear end of the valve engages the rear wall 27 of the valve chamber, the groove 24 registers with the port 21 as in Figure 3; and when the forward end of the valve engages the inner nipple 19', the groove 25 registers with the port 22 as in Figure 4. Finally a duct 28 is formed in the partition 19 and extends to the rear wall 27 of the valve chamber to connect the piston chamber with the valve chamber at the rear end of the latter.

Still another line 29 connects the valve casing 9 to the reservoir 1. The valve casing contains a valve plug 30 operable by an external handle 31 and having a pair of passages 32 and 33 cut therein. In one position of the valve, as shown in Figure 1, the passage 32 connects the pipes 8 and 20, or in other words, brings the grease gun into communication with the loading port 21; while the passage 33 connects the lines 14 and 29 and brings the pressure opening 13 into communication with the reservoir. In another position of the valve, as shown in Figure 2, the lines 8 and 14 are connected by the passage 32, so that the grease gun communicates with the pressure opening 13; and the passage 33 connects the pipes 20 and 29.

In the operation of the present invention, a fundamental characteristic is the use of a pair of lubricant feed lines operative under differential pressure conditions, this feature being presented also in the companion application, Serial No. 341,958, referred to above. In each instance, the lines are arranged in such manner that high pressures can be applied to one of the lines while the other is under low pressure conditions, the arrangement providing for a reversal of these conditions so that the high pressure line at one stage of the operation of the device becomes the low pressure line of the system at another stage of the operation. The present embodiment, like that of the companion application, utilizes a supply tank for the lubricant, a "gun" for applying the pressure, and connections between the device and the gun and tank, these connections including a control valve or valves arranged so that the high pressure line will be brought into communication with the gun, while the low pressure line is placed in communication with the tank, the valve shown being arranged to produce the changed connections when the shift is made from the high to the low pressure condition of a feed line, this being a preferred form of arrangement by reason of the simplicity of connections and operation.

The above will be understood from the drawing, in Fig. 1 of which the position of valve 9 indicates that line 20 is the high pressure line while line 14 is the low pressure line; in Fig. 2, line 14 is the high pressure line, while line 20 becomes the low pressure line. This result is due to the fact that line 8 is the permanent high pressure line source, while line 29 forms the return line to the tank and is therefore subject to the tank pressure which is generally atmospheric pressure.

The advantage of such arrangement lies in the fact that it is possible to subject the individual lubricating devices which may be connected up to the lines, to pressures sufficient to move the elements therein positively under all conditions and with comparative rapidity, making it possible to operate the system at frequent intervals with an assurance that the proper delivery of lubricant will be had, even where a large number of devices may be present on the lines. This advantage is especially important where the lubricant is of heavy oil or of grease characteristic.

In a number of respects, the structures of the lubricating devices of the companion application referred to are similar to that shown herein, the main distinction, operatively, being in connection with the operation of valve 23, the present invention utilizing lubricant pressure to return the valve, while, in the companion application the return movement is by spring pressure. The latter is adapted more particularly for use with lighter oils as the lubricant, while the present form is additionally adapted for use with grease as the lubricant, although adapted for operation with other lubricants as well. Since lubricating with grease is the more difficult, the present explanation will be made on the assumption that the lubricant in use is that of grease.

The inactive position of the parts of the device is shown in Fig. 4, the parts having been moved to this position while valve 9 is in the position of Fig. 2. The piston of the gun 2 has been moved to the left in Fig. 1 to load the gun. When it is desired to operate the device, valve 9 is shifted to the position of Fig. 1, thus placing line 20—20' in communication with the gun, line 14—14' being in communication with the tank. As the gun plunger is advanced, the movement of lubricant in line 20—20' will apply pressure and lubricant advance in channel 26, and thus apply pressure at the right of valve 23, to shift the latter toward the left in Fig. 4. To permit this, the lubricant in the space at the left of the valve must be displaced, and this lubricant passes into channel 28. The latter is permitted by the fact that the lubricant above piston 11 is open to the low pressure conditions of the tank, so that piston 11 is thus subject to the high pressure action through channel 28 with the resistance limited to the low pressure line 14, the result being that piston 11 can move upwardly such distance as may be necessary to permit displaced lubricant in channel 28 to move into the loading chamber of the device. It may be noted that this displaced lubricant of channel 28 is more or less a working pressure-applying agent for the return operation of the valve, having no outlet other than channel 28.

When valve 23 advances a distance sufficient to bring channel 26 into communication with port 21, channel 25 having passed out of communication with port 22 during the advance—the lubricant advancing from line 20 under the high pressure is admitted to the loading chamber through port 21, this condition serving to move piston 11 to the position of Fig. 3, the lubricant above the piston moving into the low pressure line 14. When in the position of Fig. 3, the device is loaded, and when this stage is reached with respect to the several devices of the system, the gun is operated to release the pressure and obtain a new charge, after which valve 9 is shifted to the position of Fig. 2, reversing the high and low pressure line conditions, line 14—14' becoming the high pressure side, while line 20—20' becomes the low pressure side. When the gun plunger is then advanced, the upper side of piston 11 will be subject to the high pressure.

As will be understood, discharge of the loaded charge through port 22 to the point of lubrication is dependent on the movement of valve 23 to the right from the position of Fig. 3, in order that channel 25 may be brought into communication with port 22. This movement of valve 23 is provided by the downward movement of piston 11, and results from the development of conditions that are produced by the particular arrangement of parts and the conditions of the differential in pressure between the lines.

It will be understood, of course, that valve 23 requires no service as a valve closure for channel 28, such closure being unnecessary, so that no valve-seat conditions are present, and in service, the left end of the valve in Fig. 3 is subject to the pressure of the loading chamber throughout the area of such valve end. When, therefore, piston 11 begins its downward travel, the pressure in the loading chamber will be transmitted both in channel 28 and port 21. In channel 28 and in port 21 and channel 26, pressure drop conditions are present, but are more effective with channel 26, and especially when the pressure activity of plunger 11 has become effective through line 20', the resistance of the latter being far below that of the left end of valve 23, so that at such time, there is a marked differential in pressure at the opposite ends of valve 23, in favor of the left end, with the result that valve 23 is shifted toward the right, such shifting obviously increasing this differential since communication through port 21 is decreasing as the valve returns, the complete pressure being applied when such communication ends, so that valve 23 is thus forced to the position of Fig. 4, providing complete communication between the loading chamber and the point to be lubricated, through port 22 and channel 25, the cycle being completed when piston 11 reaches the position of Fig. 4.

As will be understood, valve 23 will be held in its proper positions by such differential in pressure. When moved to the left in Fig. 4, the pressure at the right end of the valve is that of the high pressure line, while the pressure at the left is that of the low pressure line, until piston 11 reaches its upper position when the pressures at opposite ends of the valve become equal. When the valve is moved to the right in Fig. 3, the pressure at the left is that of the high pressure line (or the loading chamber pressure) while the pressure at the right end of the valve is that of the low pressure line. Hence, the differential in pressure conditions will retain the valve in its proper operating position because of the particular application of these pressures at such periods. Since the activity of valve 23 is primarily that of a slide valve with respect to ports 21 and 22, it will be understood that after communication between channel 26 and port 21 is cut off, the further discharge of lubricant from the loading chamber will be through port 22; as the return movement of valve 23 is similar in successive operations, it is obvious that successive charges delivered to the point of lubrication will be substantially uniform as to quantity.

When the body 10 has been emptied, the condition with respect to all of the devices of the system will be apparent to the operator by the cushioning effect produced on the gun piston 4 produced by lubricant above the pistons 11 of the several devices. The gun pressure is then released, thus placing the parts in the position of Fig. 4 ready for the succeeding cycle.

When operating with grease as the lubricant, it is possible that complete return of lubricant from the low pressure line to the tank will not be had. Grease being more or less compressible, the displacement of lubricant in the low pressure line may be gradually dissipated if the line be lengthy, but it will be obvious that in all cases the trend of displacement in the low pressure line is toward the tank or reservoir 1.

Although a specific embodiment of the invention has been illustrated and described, it will be understood that various alterations in the details of construction may be made without departing from the scope of the invention as indicated by the appended claims.

What I claim is:

1. A lubricating device comprising a reservoir, a gun in communication therewith, a pump including a body and a piston reciprocable therein, said body having a loading opening and a discharge opening at one side of the piston and a pressure opening at the other side, means for selectively connecting said gun to said loading and pressure openings, and a pressure operated slide valve adapted to control said loading and discharge openings, said valve being movable in the direction to open the loading opening and close the discharge opening by gun pressure applied through the loading opening in loading the device, and movable in the opposite direction to open the discharge opening and close the loading opening by gun pressure through the pressure opening when the device is loaded, said valve being dimensioned to close said loading or discharge openings completely before permitting flow through the other of these openings.

2. A lubricating device comprising a reservoir, a gun in communication therewith, a pump including a body and a piston reciprocable therein, said body having a loading opening and a discharge opening at one side of the piston and a pressure opening at the other side, a valve adapted to connect said gun to said loading opening and connect said pressure opening to said reservoir in one position and to connect said gun to said pressure opening in another position, and a pressure operated slide valve adapted to control said loading and discharge openings, said valve being movable in the direction to open the loading opening and close the discharge opening by gun pressure applied through the loading opening in loading the device, and movable in the opposite direction to open the discharge opening and close the loading opening by gun pressure through the pressure opening when the device is loaded, said valve being dimensioned to close said loading or discharge openings completely before permitting flow through the other of these openings.

3. A lubricating device comprising a pump including a body and a piston reciprocable therein, said body having a loading opening and a discharge opening at one side of the piston and a pressure opening at the other side, means for alternately applying pressure to said loading and pressure openings, and a pressure operated control valve adapted to obstruct said loading opening by discharge pressure on said piston and to control said loading and discharge openings, said valve being movable in the direction to open the loading opening and close the discharge opening by gun pressure applied through the loading opening in loading the device, and movable in the opposite direction to open the discharge opening and close the loading opening by gun pressure through the pressure opening, said valve being dimensioned to close said loading or discharge openings completely before permitting flow through the other of these openings.

4. A lubricating device comprising a pump including a body having a piston chamber and a piston reciprocable therein, said body having a loading opening and a discharge opening at one side of the piston and a pressure opening at the other side, means for selectively applying pressure to said loading and pressure openings, said body having a valve chamber adjacent said loading and discharge openings, the connection to said loading opening including a delivery member at one end of said chamber, the other end of said chamber being in communication with the piston chamber of said body, a slide valve in said valve chamber adapted to control said loading and discharge openings by pressures at said delivery member and at the other end of said valve chamber respectively, said valve being dimensioned to close said loading or discharge opening completely before permitting flow through the other of these openings.

5. In lubricating systems, a source of lubricant supply, a valve structure for controlling delivery of lubricant to the point of lubrication, a pair of lubricant feed conduits between the lubricant supply and the valve structure, pressure means for delivering lubricant through the conduits, said valve structure including a piston chamber, a piston movable in said chamber, said feed conduits constituting feed lines for the chamber individual to opposite sides of the piston, the pressure means supplying lubricant through one line to move the piston in one direction and to discharge the chamber contents of the opposite side, the similar action of the pressure means for the second line returning the piston to thereby discharge the lubricant previously admitted from the first line, said valve structure having a passage connecting one side of the chamber with the point of lubrication, a valve shiftable in its opposite directions of movement by feed line pressure for controlling flow through such passage, said valve being operative in the feed line of such side of the chamber to prevent concurrent lubricant flow to such feed line and to the point of lubrication during discharge of the lubricant from such side of the chamber, and means for controlling the flow of lubricant through the lines individually.

6. A system as in claim 5 characterized in that the flow control means for the lines is in the form of an individual control valve common to the lines and operative to limit pressure application to the lines individually and to permit flow in the direction of the supply and within the non-pressure line to permit return to the latter line of lubricant necessary to be displaced to enable operation of the shiftable valve.

7. A lubricating device comprising a reservoir, a gun in communication therewith, a pump including a body, a piston chamber and a piston reciprocable therein, said body having a loading opening and a discharge opening at one side of the piston and a pressure opening at the other side, means for selectively connecting said gun to said loading and pressure openings, said body having a valve chamber adjacent said loading and discharge openings, said means for connection to said loading opening including a delivery member at one end of said chamber, the other end of said chamber being in communication with the piston chamber of said body, a slide valve in said valve chamber adapted to control said loading and discharge openings by pressure at said delivery member and at the other end of said valve chamber by pressure transmitted by said piston from said pressure opening respectively, said valve being dimensioned to close said loading or discharge opening completely before permitting flow thru the other of these openings.

8. A lubricating device comprising a reservoir, a gun in communication therewith, a pump including a body and a piston reciprocable therein, said body having a loading opening and a discharge opening at one side of the piston and a pressure opening at the other side, a valve adapted to connect said gun to said loading opening and connect said pressure opening to said reservoir in one position and to connect said gun to said pressure opening in another position, said body having a valve chamber adjacent said loading and discharge openings, said means for connection to said loading opening including a delivery member at one end of said chamber, the other end of said chamber being in communication with the piston chamber of said body, a slide valve in said valve chamber adapted to control said loading and discharge openings by pressure at said delivery member and at the other end of said valve chamber by pressure transmitted by said piston from said pressure opening respectively, said valve being dimensioned to close said loading or discharge opening completely before permitting flow thru the other of these openings.

9. A lubricating device comprising a reservoir, a gun in communication therewith, a pump including a body and a piston therein, said body having a pressure inlet a loading opening and a discharge opening at one end and a second pressure inlet at the other end, means for selectively connecting said gun to said loading opening and second pressure inlet, and a pressure operated slide valve adapted to selectively obstruct said loading opening by pressure on said piston transmitted from said second pressure inlet and to obstruct said discharge opening by reverse pressure from said first-named pressure inlet, said valve being dimensioned to close said discharge opening completely before permitting flow thru said loading opening.

10. A lubricating device comprising a reservoir, a gun in communication therewith, a pump including a body and a piston reciprocable therein, said body having a loading opening and a discharge opening at one side of the piston and a pressure opening at the other side, means for selectively connecting said gun to said loading and pressure openings, a pressure operated slide valve adapted to alternately open and close said loading and discharge openings by pressure applied at the ends of said valve, intake means at one end of said valve adapted to communicate with said loading opening, the opposite end of said valve being in open communication with the interior of said body, alternately applied gun pressure at the selected loading or pressure opening serving to produce conditions of differential in pressure between opposite ends of the valve.

11. A lubricating device comprising a reservoir, a gun in communication therewith, a pump including a body and a piston reciprocable therein, said body having a loading opening and a discharge opening at one side of the piston and a pressure opening at the other side, means for selectively connecting said gun to said loading and pressure openings, a pressure operated slide valve adapted to alternately open and close said loading and discharge opening by pressure applied at the ends of said valve, a pressure inlet at one end of said valve, said valve having an angular intake duct at one end adapted to connect said pressure inlet with said loading opening, means of fluid communication from the interior of said body to the other end of said valve, said valve being dimensioned to close said loading or discharge opening before permitting flow thru the other of these openings.

12. A lubricating system comprising a lubricant supply, pressure means delivering lubricant therefrom under pressure, and a lubricant delivery device for delivering charges of lubricant to a point of lubrication, said device including a body having a chamber and a piston reciprocable therein, said body having a valve chamber, a loading opening and a discharge opening on one side of the piston, and leading to said valve chamber, a pressure inlet at the other side of such piston, a pressure inlet for said valve chamber, means for operatively connecting said pressure means alternately to said pressure inlets, and a slidable valve in said valve chamber being movable in one direction by pressure in said second pressure inlet and in the opposite direction by pressure transmitted by said piston from said first-named pressure inlet.

LEONARD R. KERNS.